No. 634,120. Patented Oct. 3, 1899.
W. H. MOORE.
PROSPECTOR'S PAN.
(Application filed Jan. 27, 1898.)

(No Model.)

WITNESSES:

INVENTOR
W. H. Moore.
BY
ATTORNEYS.

United States Patent Office.

WILLIAM HENRY MOORE, OF DEADWOOD, SOUTH DAKOTA, ASSIGNOR OF ONE-THIRD TO KITTIE Z. KIDD, OF SAME PLACE.

PROSPECTOR'S PAN.

SPECIFICATION forming part of Letters Patent No. 634,120, dated October 3, 1899.

Application filed January 27, 1898. Serial No. 668,156. (No model.)

*To all whom it may concern:*

Be it known that I, WILLIAM HENRY MOORE, of Deadwood, in the county of Lawrence and State of South Dakota, have invented a new and Improved Prospector's Pan, of which the following is a full, clear, and exact description.

The object of the invention is to provide a prospector's pan which will be efficient, durable, and economic and by the use of which a prospector will be enabled to pan out faster than is possible with the pan commonly used and with less danger of losing any values.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
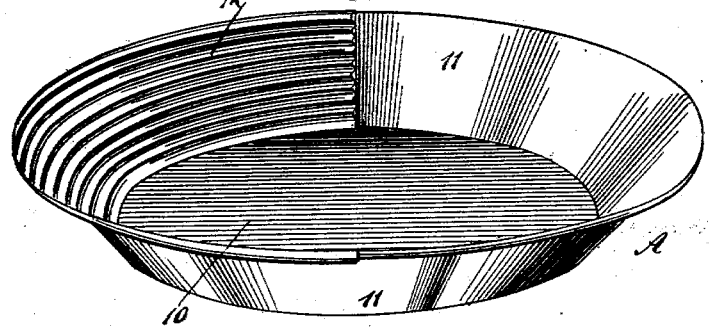
Figure 2:
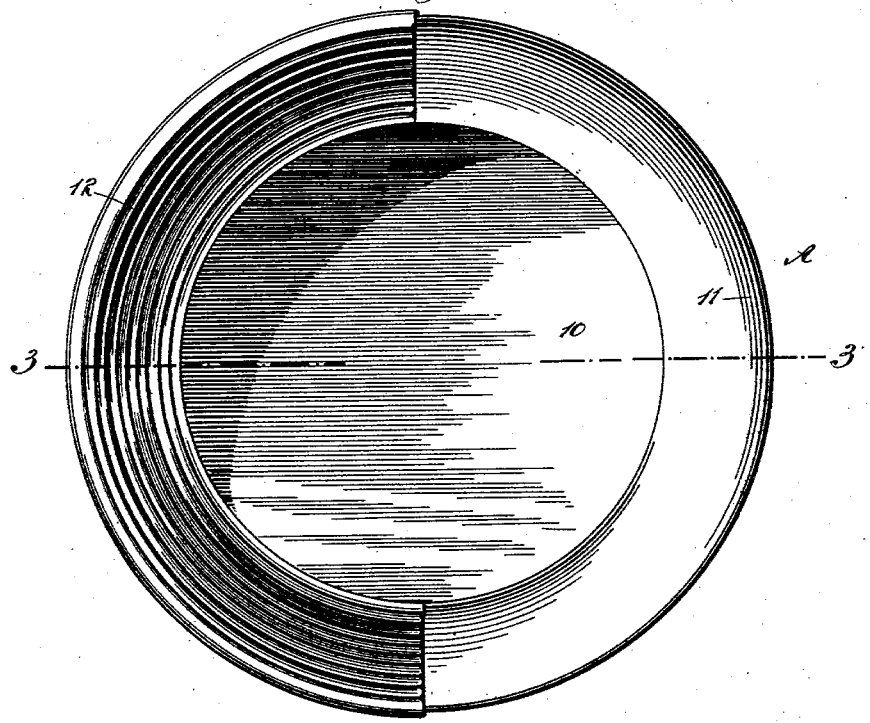
Figure 3:
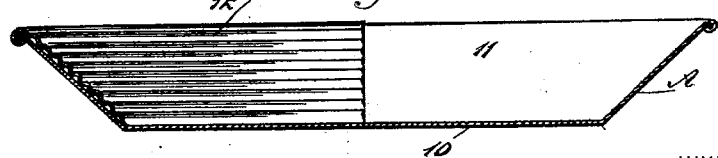

Figure 1 is a perspective view of the improved pan. Fig. 2 is a plan view thereof, and Fig. 3 is a vertical section on the line 3 3 of Fig. 2.

The pan A is made of any suitable material—as, for example, steel, iron, copper, brass, or tin—and is very similar in general contour to the ordinary prospecting-pan, comprising a bottom 10 and a rim 11, which rises from the bottom and is flared outwardly. The rim and the bottom may be secured together in any suitable or approved manner or the entire pan may be stamped from one piece of material. About one half of the circumference of the rim 11 is provided with a corrugated, indented, or riffled inner surface 12, the corrugations when used being horizontally disposed or concentric with the rim in which they are formed and to which the corrugated, indented, or riffled surface may be attached, since the currugated, indented, or riffled surface may be formed integrally in or upon the rim or may be produced in a separate piece of metal secured to the rim, as in practice may be found most desirable. Under such construction when water is passed over that side of the pan having the surface 12 small riffles are formed, but the other half or portion of the rim is smooth and in that manner resembles an ordinary pan.

After the sand or gravel to be prospected has been placed in the pan and said pan filled with water the pan is agitated for a few moments by being shaken in the hand. This movement of the pan frees all the particles of gold from the sand and gravel and the gold immediately finds its way to the bottom of the pan. The prospector will then discharge the gravel and coarse sand by washing them over the portion 12 of the pan. The particles of gold are kept as near the bottom as possible by constantly shaking the pan, and as the particles of gold are carried down the surface 12 of the pan they find their way into the riffles and are there retained. The riffles admit of the prospector discharging the coarse material very rapidly without danger of losing any gold, while with a smooth pan the process is exceedingly slow and much of the gold is lost. After the material has been washed over the riffle portion of the pan the prospector may turn the pan around and wash off the fine sand over the smooth surface of the pan or he may finish over the riffles if he so desires; but it is generally better to finish over the smooth side of the pan, as at that portion the gold is more clearly visible.

By having the corrugations or riffles extend only partially around the pan a combination-pan is produced having both a riffled and a smooth or plain surface, thus rendering it unnecessary to employ two pans. The entire process of panning is thus readily performed in one pan, and the operator can pan much faster than with the ordinary pans and without any risk of losing the gold. The coarse material is discharged very rapidly over the riffled portion, and when the material has been reduced sufficient to enable the prospector to see the results the work is finished on the smooth or plain portion of the pan. As before stated, the gold is more clearly visible at the smooth or plain portion and there is less liability of losing the gold when the finer material is washed off over the smooth or plain surface of the pan.

Having thus described my invention, I claim as new and desire to secure by Letters Patent—

1. A prospecting-dish or the like having riffles upon a side wall, said riffles extending only a portion of the way around said wall; substantially as described.

2. A prospector's pan provided with indentations or corrugations made circumferentially in the inner face of the rim forming a riffled surface, the said corrugations extending only partly around the rim, the remaining portion of the rim at its inner face being smooth from the top to the bottom of the rim, for the purpose set forth.

3. A prospector's pan having its rim at one side of the pan provided with a series of indentations formed circumferentially therein and constituting a riffled surface, the inner face of the rim at the other side of the pan having a smooth surface, as and for the purpose set forth.

4. A prospector's pan comprising a bottom and an outwardly-flared rim rising from the bottom, approximately one half the circumference of the rim having a smooth inner face from the bottom to the top thereof, the other half or portion of the rim having a series of horizontally-disposed corrugations on its inner face, the corrugations extending from the bottom of the pan to the outer edge of the rim, forming a riffled surface, as and for the purpose specified.

WILLIAM HENRY MOORE.

Witnesses:
FRANK MCLAUGHLIN,
J. P. HYMER.